July 28, 1925.
A. H. TINNERMAN
BOLT SECURING MEANS
Filed Dec. 6, 1923
1,547,628
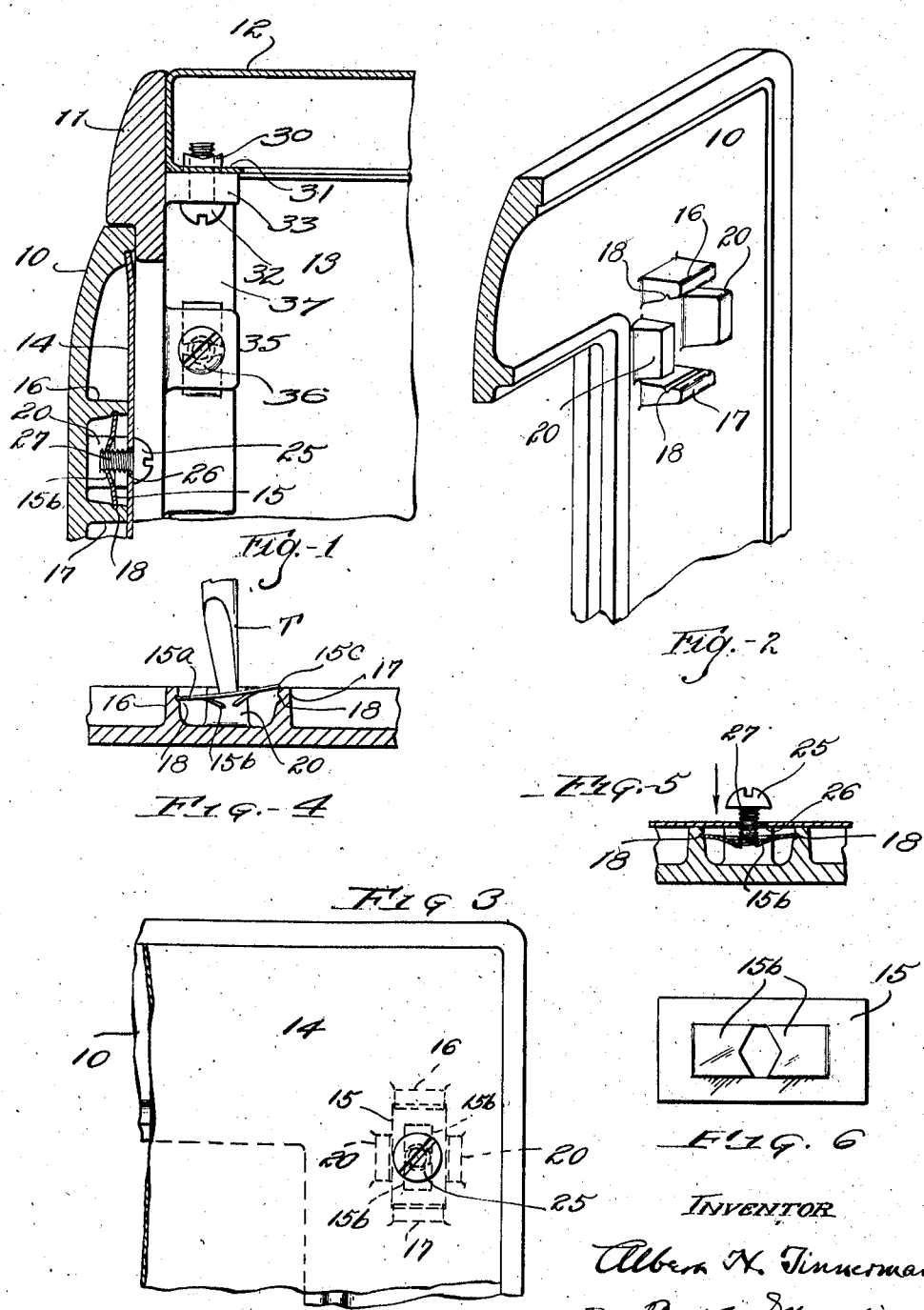
INVENTOR
Albert H. Tinnerman,
BY Baker & Macklin,
ATTYS.

Patented July 28, 1925.

1,547,628

UNITED STATES PATENT OFFICE.

ALBERT H. TINNERMAN, OF CLEVELAND, OHIO.

BOLT-SECURING MEANS.

Application filed December 6, 1923. Serial No. 678,871.

*To all whom it may concern:*

Be it known that I, ALBERT H. TINNERMAN, a citizen of the United States, residing at Cleveland, in the county of Cuyahoga and State of Ohio, have invented a certain new and useful Improvement in a Bolt-Securing Means, of which the following is a full, clear, and exact description, reference being had to the accompanying drawings.

This invention is directed to the provision of a novel and very simple and effective means for securing members or elements of various structures by the use of a means operating on the spring nut principle whereby very convenient assembling of the parts may be effected regardless of inacessibility of threaded ends of the bolts during the assembling operation.

The object of my invention is the provision of a novel arrangement including a spring nut means secured by one element to which a second element is to be secured by the use of one or more bolts which may be passed through openings in the second element when the latter is brought into alignment with the spring nut being carried by the first element.

A more specific object of my invention is the provision of a bolt engaging means on an element to which a second element is to be secured, the bolt engaging means being such that the bolt may be snapped or pressed into substantially final position whereby assembling of the elements in a structure may be greatly simplified, thus greatly reducing the time required for assembling.

Other objects of my invention will hereinafter become apparent in the following description which refers to the accompanying drawings illustrating an adaptation thereof to stove structures. The essential characteristics are summarized in the claims.

In the drawings Fig. 1 is a cross-sectional view taken through a portion of a stove door and a portion of a stove oven structure; Fig. 2 is a perspective view of one corner of a stove door frame; Fig. 3 is a fragmentary elevational view of the corner of a stove door structure; Fig. 4 is an enlarged cross-sectional detail illustrating the manner of assembling a spring nut on integral lugs formed on a cast stove door frame; Fig. 5 is a view similar to Fig. 4 showing the relationship of two assembled elements of the door construction maintained in position by a spring nut and bolt such as I have heretofore referred to; and Fig. 6 is a plan view of a spring nut which may be used in one form of my invention.

In the manufacturing and assembling of metallic parts it is frequently desirable to drill holes in the metal which do not extend completely through the element in which the holes are formed, whereby other members may be assembled on that element by the use of bolts. Incident to this common practice it is necessary to tap or thread the holes and taps are frequently broken in the holes due to carelessness or the lack of skill on the part of the mechanic. In this event it becomes necessary to anneal the broken tap portion in order to remove it from the hole. As an example of this in the manufacture of stoves there are many of the parts, particularly the cast oven doors which are lined with sheet metal, the sheeting or panels being maintained in position by the use of stove bolts which pass through openings in the sheeting and engage the cast door frame in threaded holes. Such castings are usually very light and lugs are provided which may be drilled and tapped or threaded. Such operations must be consummated with care and skill, however, as the drills and taps are frequently broken, particularly where hard spots are present in the metal. One form of my invention contemplates the elimination of these operations by the use of spring nuts which may be positioned and maintained in place to receive threaded ends of stove bolts, the bolts being snapped into position by being forced through an opening in a spring nut having resilient thread engaging edges.

In Fig. 1, I show in cross-section a front upper corner of the oven structure of a stove wherein the door frame casting is indicated by the reference numeral 10 and which is mounted (in a manner not shown) on a front frame member 11. This frame member carries a top panel 12 and side panels 13 of the oven. The door frame 10 is usually provided with a metal lining 14 which is secured to the door frame in a manner now to be described.

In my application on a spring nut, Serial No. 613,628, filed January 19, 1923, I disclose a spring nut structure such as illustrated in Fig. 6. As shown in Fig. 2 I form lugs 16 and 17 which may be integrally cast to extend from the inner face of the door frame casting 10. These lugs are spaced apart a distance less than the length of the spring nut 15 shown in Fig. 6 and are provided with notches 18 of sufficient width and depth to receive the ends of the spring nut 15. This spring nut may be positioned on the lugs in a manner shown in Fig. 4, one end 15ª thereof being positioned in notch 18 of the lug 16 with the spring tongues 15ᵇ thereof extending inwardly. Any suitable tool may then be utilized to deflect the spring nut by applying pressure at the middle thereof to cause the other end 15ᶜ to be snapped into the notch 18 of the lug 17 as shown in Fig. 5. Two opposed lugs 20 may be provided which are spaced apart a distance slightly greater than the width of spring nut 15 to prevent any lateral displacement thereof when once positioned in the notches of the lugs 16 and 17.

The lining plate 14, it will be readily seen, may be quickly assembled upon the door frame 10 by passing a stove bolt 25 through a properly located opening 26 formed in the plate by exerting pressure upon the head of the stove bolt 25 in the direction of the arrow as shown in Fig. 5. The thread 27 thereof will be forced inwardly, thus deflecting the spring tongues 15ᵇ which engage the threads until the bolt head contacts with the surface of the plate 14. A slight turn of the bolt will then cause the spring nut tongues to straighten somewhat and thus securely clamp the plate 14 in position on the door frame.

In Fig. 1, I show a simplified form of my invention wherein spring tongues 30 are struck up from the plane of the flange 31 formed on the top panel member 12, the tongues being an integral part of the flange. A stove bolt 32 extends through a suitable opening formed in the frame casting lug 33 projecting inwardly from the frame member 11. When the opening in the lug 33 is brought into approximate alignment with the thread engaging edges of the spring tongues 30, the members 11 and 12 may be secured together by simply forcing the stove bolt 32 upwardly through the lug opening until the head thereof engages the underface of the lug 33. A quarter or half turn of the stove bolt with a screw driver completes this assembling operation thus causing the threads of the stove bolt to firmly engage the spring tongues. At 35 in Fig. 1, I show the same arrangement wherein stove bolt 36 engages tongues formed on the inwardly turned flange 37 of the side panel member 13.

It will be readily seen that my invention is adaptable to a variety of uses other than the joining of stove parts and furthermore that I obviate the necessity of drilling and tapping blind holes in castings and obtain a bolt clamping action in a very economical and effective manner. The assembling of the parts involves only simple unskilled operations on the part of the mechanic. It will also be apparent that if it is desired to join two sheet metal members that in place of the spring tongue 15ᵇ similarly formed tongues may be stuck up from the plane of one of the sheet metal members thus obviating the necessity for the use of a nut or the tapping of holes.

Having thus described my invention, I claim:

1. In a stove construction, the combination of a frame member having lugs formed thereon adapted to engage and retain a spring nut, a spring nut in engagement with said lugs having tongues extending towards the body of the frame member, a metal plate extending over said lugs and a bolt extending through said plate and engaging said tongues whereby the plate may be rigidly clamped relative to the frame.

2. In a stove construction, the combination of a frame member having lugs extending from the body thereof, a nut formed of spring metal and having thread engaging tongues mounted on said lugs in spaced relation to the body of the frame, a sheet metal member and a bolt extending through an opening formed therein and engaging the tongues of the nut to maintain the sheet metal member in assembled relation to said frame member.

3. A stove frame member having pairs of opposed lugs, a spring nut disposed between said lugs, two of the opposite lugs engaging the ends of the spring nut, the other lugs adapted to engage the sides thereof, a lining plate for said frame member formed of sheet metal and a bolt extending through the lining plate and engaging the spring nut to maintain said lining plate in assembled relation with the frame member.

4. In a stove construction the combination of a frame member having lugs formed thereon adapted to receive a thread engaging member, a separate thread engaging member carried by said lugs, a metal plate resting on said lugs and held against shifting by said lugs and a bolt extending through said plate with its threads engaging said member whereby the plate may be rigidly clamped upon the lugs.

5. In a stove construction, the combination of a frame member having lugs extending from the body thereof, a spring nut mounted on said lug in spaced relation to the body of the frame, a member to be secured to the frame and a bolt extending through an opening formed therein and engaging the spring nut to maintain the last named member in assembled relation to said frame member, the bolt engaging the spring nut in such manner as to cause the unit to be slightly elongated and thrust against said lugs.

6. A stove frame member having pairs of opposed lugs, a nut disposed between said lugs and held in position by the lugs against removal from the frame, two of the opposite lugs engaging the ends of the nut, the other lugs adapted to engage the sides thereof, a plate for said frame member formed of sheet metal and a bolt extending through the plate and engaging the nut to maintain said plate in assembled relation with the frame member.

7. In a stove construction the combination of a frame member, lugs formed on said member, a nut formed of sheet metal adapted to be held in spaced relation to the frame by the lugs, the body of said nut being curved, a plate overlying the frame and a bolt extending through the plate to secure it to the frame, said bolt engaging the nut from the inner side of the curve whereby when the bolt is tightened the nut is forced more securely into engagement with the lugs.

In testimony whereof, I hereunto affix my signature.

ALBERT H. TINNERMAN.